(12) United States Patent
Kondo et al.

(10) Patent No.: US 9,932,916 B2
(45) Date of Patent: Apr. 3, 2018

(54) COMBUSTION CONTROL APPARATUS FOR INTERNAL COMBUSTION ENGINE (71) Applicant: HONDA MOTOR CO., LTD., Tokyo (JP)

(72) Inventors: Takashi Kondo, Wako (JP); Hiroshi Hanabusa, Wako (JP); Kohtaro Hashimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 205 days.

(21) Appl. No.: 14/897,884

(22) PCT Filed: Jan. 30, 2015

(86) PCT No.: PCT/JP2015/052676
§ 371 (c)(1),
(2) Date: Dec. 11, 2015

(87) PCT Pub. No.: WO2015/137003
PCT Pub. Date: Sep. 17, 2015

(65) Prior Publication Data
US 2016/0115880 A1 Apr. 28, 2016

(30) Foreign Application Priority Data

Mar. 10, 2014 (JP) .................................. 2014-046308
Mar. 10, 2014 (JP) .................................. 2014-046310

(51) Int. Cl.
*F02D 37/02* (2006.01)
*F02P 5/15* (2006.01)
(Continued)

(52) U.S. Cl.
CPC ............. *F02D 37/02* (2013.01); *F01N 3/101* (2013.01); *F02D 41/0255* (2013.01);
(Continued)

(58) Field of Classification Search
CPC ......... Y02T 10/46; F02P 5/045; F02P 5/1502; F02P 5/145; F02P 5/152; F02P 9/002;
(Continued)

(56) References Cited

U.S. PATENT DOCUMENTS

| | | | | |
|---|---|---|---|---|
| 4,103,653 A | * | 8/1978 | Ueno | ........................ F02P 5/14 |
| | | | | 123/406.11 |
| 5,211,147 A | * | 5/1993 | Ward | ...................... F02B 17/00 |
| | | | | 123/406.47 |

(Continued)

FOREIGN PATENT DOCUMENTS

| | | |
|---|---|---|
| JP | 62-038853 A | 2/1987 |
| JP | 2000-045844 A | 2/2000 |

(Continued)

OTHER PUBLICATIONS

Hiroshi Sono, et al, "Proposal of New Homogenous Lean Charge Spark Ignition (HLSI) Combustion", 189-2015501, Automotive Engineers Society Academic Seminar Proceeding, No. 121-12(Oct. 2012).

(Continued)

*Primary Examiner* — Sizo Vilakazi
(74) *Attorney, Agent, or Firm* — Squire Patton Boggs (US) LLP (57) ABSTRACT

A combustion control apparatus for an internal combustion engine includes a spark plug for performing spark ignition of an air-fuel mixture in the combustion chamber, a plurality of coil pairs for generating spark discharge in the spark plug, and a fuel injection valve capable of injecting atomized fuel. Atomized fuel is injected into the intake passage, and a homogeneous lean air-fuel mixture is formed in the combustion chamber. The air-fuel ratio of the air-fuel mixture in the combustion chamber is controlled to be leaner than a predetermined lean air-fuel ratio. A spark discharge start timing and a spark discharge continuation time period are (Continued)

controlled using the plurality of coil pairs. The spark discharge start timing is set to a timing advanced from the spark discharge start timing for igniting a stratified lean mixture, such that the air-fuel ratio in the vicinity of the spark plug is relatively small.

18 Claims, 8 Drawing Sheets

(51) Int. Cl.
| | |
|---|---|
| F01N 3/10 | (2006.01) |
| F02D 41/02 | (2006.01) |
| F02D 41/14 | (2006.01) |
| F02D 41/30 | (2006.01) |
| F02D 41/40 | (2006.01) |
| F02P 3/045 | (2006.01) |
| F02P 5/04 | (2006.01) |
| F02P 15/10 | (2006.01) |
| F02D 41/00 | (2006.01) |
| F01N 13/00 | (2010.01) |

(52) U.S. Cl.
CPC ..... *F02D 41/1456* (2013.01); *F02D 41/1461* (2013.01); *F02D 41/3041* (2013.01); *F02D 41/402* (2013.01); *F02P 3/0453* (2013.01); *F02P 5/045* (2013.01); *F02P 5/15* (2013.01); *F02P 5/1506* (2013.01); *F02P 15/10* (2013.01); *F01N 13/008* (2013.01); *F01N 2560/025* (2013.01); *F02D 41/0002* (2013.01); *F02D 2200/0802* (2013.01); *Y02T 10/22* (2013.01); *Y02T 10/26* (2013.01); *Y02T 10/44* (2013.01); *Y02T 10/46* (2013.01)

(58) Field of Classification Search
CPC .......... F02P 5/1504; F02P 5/1512; F02P 9/00; F02P 5/04; F02P 5/153; F02P 5/1506; F02P 5/15; F02P 5/151; F02P 5/1521; F02D 37/02
USPC .............. 123/406.11, 406.12, 406.19, 406.2, 123/406.26, 406.44
See application file for complete search history.

(56) References Cited

U.S. PATENT DOCUMENTS

| | | | | |
|---|---|---|---|---|
| 5,588,410 | A * | 12/1996 | Tamura | F02D 35/0023 123/406.47 |
| 5,595,060 | A * | 1/1997 | Togai | F01N 3/0842 60/274 |
| 6,553,981 | B1 * | 4/2003 | Suckewer | F02P 3/0884 123/620 |
| 7,472,687 | B2 * | 1/2009 | Zhu | F02P 17/12 123/406.14 |
| 7,690,352 | B2 * | 4/2010 | Zhu | F01N 3/2006 123/406.14 |
| 2015/0337751 | A1 * | 11/2015 | Watanabe | F02D 13/02 701/113 |

FOREIGN PATENT DOCUMENTS

| | | |
|---|---|---|
| JP | 2002-256927 A | 9/2002 |
| JP | 2002-295287 A | 10/2002 |
| JP | 2005-030305 A | 2/2005 |
| JP | 2009-108760 A | 5/2009 |
| JP | 2011-001905 A | 1/2011 |
| JP | 2012-077740 A | 4/2012 |

OTHER PUBLICATIONS

International Search Report dated Mar. 3, 2015 corresponding to International Patent Application No. PCT/JP2015/052676 and English translation thereof.

* cited by examiner

COMBUSTION CONTROL APPARATUS FOR INTERNAL COMBUSTION ENGINE

TECHNICAL FIELD

The present invention relates to a combustion control apparatus for an internal combustion engine, and particularly to a combustion control apparatus in which a homogeneous lean air-fuel mixture is burned by spark ignition.

BACKGROUND ART

Lean air-fuel mixture combustion technique for performing the spark ignition of the lean air-fuel mixture (of which the air-fuel ratio is large) is well known, for example, as shown in Patent document 1 (shown below). In this lean air-fuel mixture combustion technique, NOx contained in the exhaust gases cannot be removed by the three-way catalyst. Accordingly, it is important to make the combustion limit air-fuel ratio become higher. Patent document 1 discloses a technique for stably burning the mixture of which the average air-fuel ratio in the combustion chamber is high, by stratifying the mixture so that a portion of the mixture having a relatively rich air-fuel ratio (small air-fuel ratio) exists in the vicinity of the spark plug.

However, according to this technique, a comparatively large amount of NOx is generated by the combustion in the vicinity of the spark plug. It is therefore desired to further reduce an amount of NOx emission.

In view of the above, the inventors of the present invention proposed spark ignition combustion of a homogeneous lean air-fuel mixture wherein the homogeneous lean air-fuel mixture is burned by spark ignition, thereby ensuring stable combustion as well as reducing an amount of NOx emission (Non-patent document 1). In this non-patent document 1, as a method for surely burning the homogeneous lean mixture of an air-fuel ratio around "30", setting the compression ratio to such a value that a temperature of the air-fuel mixture at the ignition timing is raised to the desired temperature, using a fuel injection valve capable of injecting atomized fuel, and the like are proposed.

PRIOR ART DOCUMENT

Patent Document

Patent Document 1: Japanese Patent Laid-open Publication No. 2002-256927

Non-Patent Document

Non-patent Document 1: Automotive Engineers Society Academic Seminar Proceeding, No. 121-12 (October 2012)

SUMMARY OF THE INVENTION

Problems to be Solved by the Invention

Non-patent document 1 shows that the lean air-fuel mixture of an air-fuel ratio around "30" can surely be burned by the proposed spark ignition combustion of the homogeneous lean air-fuel mixture, thereby reducing an amount of NOx emission. However, there is a room for further studying a specific combustion control method for applying the proposed spark ignition combustion of the homogeneous lean air-fuel mixture to mass-manufactured engines.

The present invention was made contemplating the above-described circumstances, and an objective of the present invention is to provide a combustion control apparatus for an internal combustion engine, which can surely perform the spark ignition combustion of the homogeneous lean air-fuel mixture, thereby realizing a combustion of high efficiency and reducing an amount of NOx emission.

Solution to the Problem

To attain the above objective, the present invention provides a combustion control apparatus for an internal combustion engine (1), comprising spark ignition means for performing spark ignition of an air-fuel mixture in a combustion chamber of the engine, and air-fuel ratio control means for controlling an air-fuel ratio of the air-fuel mixture in the combustion chamber. The combustion control apparatus comprises homogeneous lean mixture forming means for forming a homogeneous lean air-fuel mixture in the combustion chamber. The spark ignition means includes a spark plug (8), and a plurality of ignition coil pairs (71, 72) for generating spark discharge in the spark plug. A start timing (CAIG) and a continuation time period (TSPK) of the spark discharge in the ignition plug are variable. The homogeneous lean mixture forming means injects fuel into an intake passage (2) of the engine using a fuel injection valve (6) capable of injecting atomized fuel. The air-fuel ratio control means controls the air-fuel ratio to an air-fuel ratio which is leaner than a predetermined lean air-fuel ratio (AFL1) which leaner than the stoichiometric air-fuel ratio. The ignition control means controls the spark discharge start timing (CAIG) and the spark discharge continuation time period (TSPK) of the spark plug, and sets the spark discharge start timing (CAIG) to a timing advanced from the spark discharge start timing for igniting a stratified lean air-fuel mixture which is formed so that the air-fuel ratio in the vicinity of the spark plug is relatively small.

With this configuration, the air-fuel ratio is controlled to an air-fuel ratio which is leaner than the predetermined lean air-fuel ratio which leaner than the stoichiometric air-fuel ratio, and the atomized fuel is injected into the intake passage. Accordingly, a comparatively homogeneous lean air-fuel mixture is formed in the intake passage. Further, the formed mixture is sucked into the combustion chamber, which enables forming a lean air-fuel mixture of higher homogeneity. Further, since the spark discharge start timing and the spark discharge continuation time period of the spark plug are variable, by appropriately setting the spark discharge start timing and the spark discharge continuation time period, specifically, by setting the spark discharge start timing to a timing advanced from the spark discharge start timing for igniting the stratified lean air-fuel mixture, the spark discharge continuation time period can be set to be longer, which makes it possible to surely ignite the homogeneous lean air-fuel mixture.

Preferably, the ignition control means advances the spark discharge start timing (CAIG) and makes the spark discharge continuation time period (TSPK) longer, as the air-fuel ratio increases in a leaner air-fuel ratio range with respect to the predetermined lean air-fuel ratio (AFL1).

With this configuration, the ignition control is performed so that the spark discharge start timing is advanced and the spark discharge continuation time period is made to be longer, as the air-fuel ratio increases in the leaner air-fuel ratio range with respect to the predetermined lean air-fuel ratio, which enables stable combustion corresponding to changes in the air-fuel ratio.

Preferably, the combustion control apparatus further comprises flow generating means (2a, 4) for generating a flow of the air-fuel mixture sucked into the combustion chamber.

With this configuration, a flow of the air-fuel mixture sucked into the combustion chamber is generated. Accordingly, a strong initial flame kernel can be formed by the flow of the mixture and an appropriate setting of the spark discharge continuation time period of the spark plug, which enables combustion of high efficiency.

Preferably, the homogeneous lean mixture forming means performs a first fuel injection (FI1) by the fuel injection valve (6) during a closing time period of an intake valve (21) of the engine, and performs a second fuel injection (FI2) by the fuel injection valve during an opening time period of the intake valve.

With this configuration, the first fuel injection is performed during the closing time period of the intake valve and the second fuel injection is performed during the opening time period of the intake valve. Accordingly, the first fuel injection makes it possible to form a lean air-fuel mixture of high homogeneity in the intake passage, and the second fuel injection is thereafter performed during the opening time period of the intake valve, which makes it possible to form a lean air-fuel mixture of higher homogeneity in the combustion chamber.

Preferably, the predetermined lean air-fuel ratio is set so that an amount of NOx discharged from the combustion chamber is equal to or less than an allowable upper limit value.

With this configuration, since the predetermined lean air-fuel ratio is set so that an amount of NOx discharged from the combustion chamber is equal to or less than the allowable upper limit value, the NOx emission amount can surely be reduced to a value equal to or less than the allowable upper limit value by controlling the air-fuel ratio to a lean air-fuel ratio which is learner than the predetermined lean air-fuel ratio.

Preferably, an exhaust passage of the engine is provided with a three-way catalyst (10) containing platinum, and the combustion control apparatus further comprises first and second temperature rise acceleration control means. The first temperature rise acceleration control means performs a first temperature rise acceleration control for accelerating temperature rise in the three-way catalyst until a control switch timing (t1) immediately after start of the engine. The second temperature rise acceleration control means performs a second temperature rise acceleration control for accelerating temperature rise in the three-way catalyst after the control switch timing (t1). The first temperature rise acceleration control means performs the first temperature rise acceleration control by increasing an intake air amount of the engine, controlling the air-fuel ratio (AF) of the air-fuel mixture to a first lean air-fuel ratio (AFTRA1) which is leaner than the stoichiometric ratio, and setting the spark discharge start timing (CAIG) of the spark plug to a predetermined retard ignition timing (CATRA1) which is on the retard side with respect to the optimum ignition timing. The second temperature rise acceleration control means controls the air-fuel ratio to a second lean air-fuel ratio (AFTRA2) which is leaner than the first lean air-fuel ratio (AFTRA1), sets the spark discharge start timing (CAIG) to a timing which is further retarded from the predetermined retard ignition timing (CATRQ1), and increases the spark discharge continuation time period (TSPK).

With this configuration, the first temperature rise acceleration control is performed for accelerating temperature rise in the three-way catalyst until the control switch timing immediately after start of the engine, and the second temperature rise acceleration control is performed for accelerating temperature rise in the three-way catalyst after the control switch timing. In the first temperature rise acceleration control, the intake air amount of the engine is increased, the air-fuel ratio of the air-fuel mixture is controlled to the first lean air-fuel ratio which is leaner than the stoichiometric ratio, and the spark discharge start timing of the spark plug is set to the predetermined retard ignition timing which is retarded from the optimum ignition timing. In the second temperature rise acceleration control, the air-fuel ratio is controlled to the second lean air-fuel ratio which is leaner than the first lean air-fuel ratio, the spark discharge start timing is set to the timing which is further retarded from the predetermined retard ignition timing, and the spark discharge continuation time period is increased. The three-way catalyst containing platinum can be activated at a lower temperature by setting the air-fuel ratio to a leaner air-fuel ratio (e.g., about "22") which is leaner than the set air-fuel ratio (e.g., "16") of the conventional catalyst temperature rise acceleration control. Accordingly, by performing the second temperature rise acceleration control after the control switch timing at which the temperature of the three-way catalyst reaches a comparatively high temperature, it is possible to hasten the activation of the three-way catalyst. Consequently, fuel efficiency can be improved by making the air-fuel ratio further leaner and shortening the execution time period of the catalyst acceleration control.

Preferably, the combustion control apparatus further comprises temperature parameter obtaining means for obtaining a catalyst temperature parameter (TCAT) which has correlation with a temperature (TCAT) of the three-way catalyst, and the control switch timing (t1) is a timing at which the catalyst temperature parameter (TCAT) reaches a predetermined temperature (TCATL).

With this configuration, the control switch timing is a timing at which the catalyst temperature parameter reaches the predetermined temperature. The second temperature rise acceleration control becomes effective after the timing at which the catalyst temperature reaches the predetermined temperature. Accordingly, remarkable temperature rise acceleration effect can be obtained by performing the second temperature rise acceleration control from the time the catalyst temperature parameter exceeds the predetermined temperature.

Preferably, the second temperature rise acceleration control means reduces the air-fuel ratio (AF), advances the spark discharge start timing (CAIG), and reduces the spark discharge continuation time period (TSPK), as the catalyst temperature parameter increases.

With this configuration, the control in which the air-fuel ratio is reduced, the spark discharge start timing is advanced, and the spark discharge continuation time period is reduced, as the catalyst temperature parameter increases, is performed. The three-way catalyst containing platinum has a characteristic that the purifying performance becomes higher as the air-fuel ratio approaches the stoichiometric air-fuel ratio when the catalyst temperature becomes high. Accordingly, by reducing the air-fuel ratio as the catalyst temperature parameter increases, it is possible to obtain high purifying performance. Further, stable combustion is obtained by reducing the air-fuel ratio when advancing the spark discharge start timing and reducing the spark discharge continuation time period. Consequently, by advancing the spark discharge start timing and reducing the spark discharge continuation time period as much as possible, the engine output can be increased and the energy efficiency can be raised.

Preferably, the second temperature rise acceleration control means controls strength of the flow of the air-fuel mixture to a comparatively high degree at the beginning of the second temperature rise acceleration control, and gradually reduces the strength of the flow from the time (t2) the air-fuel ratio is reduced to a value in the vicinity of the first lean air-fuel ratio (AFTRA1).

With this configuration, the strength of the flow is controlled to a comparatively high degree at the beginning of the second temperature rise acceleration control, and the strength is gradually reduced from the time the air-fuel ratio is reduced to a value in the vicinity of the first lean air-fuel ratio. Reduction in the air-fuel ratio prevents the combustion from becoming unstable when the strength of the flow is reduced. Accordingly, it is possible to reduce the strength of the flow, thereby reducing heat loss of the combustion and improving thermal efficiency.

MODE FOR CARRYING OUT THE INVENTION

Preferred embodiments of the present invention will now be described with reference to the drawings.

Figure 1:
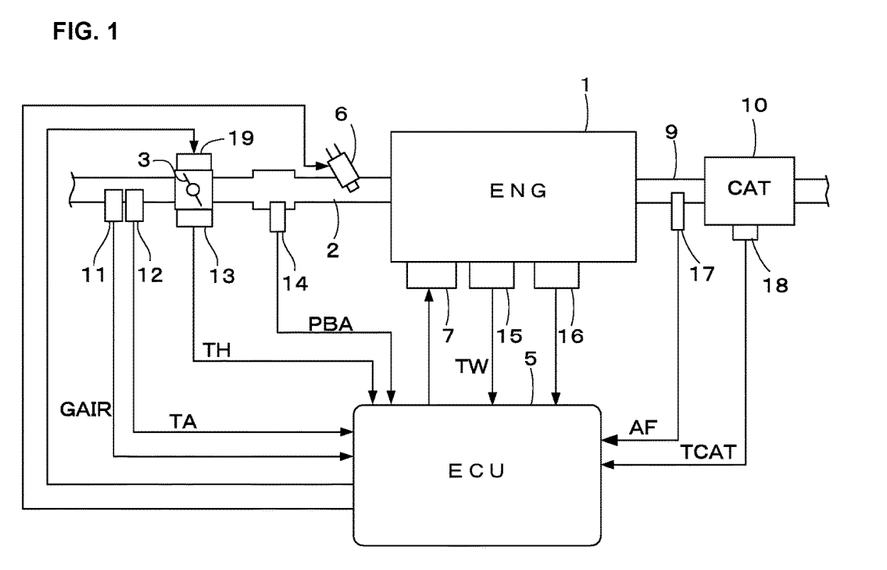
FIG. 1 shows a configuration of an internal combustion engine and a control apparatus therefor according to one embodiment of the present invention.

FIG. 1 shows a configuration of an internal combustion engine (hereinafter referred to as "engine") and a control apparatus therefor according to one embodiment of the present invention. An intake passage 2 of the engine 1 having, for example, four cylinders is provided with a throttle valve 3. A fuel injection valve 6 is provided, corresponding to each cylinder, downstream of the throttle valve 3 in the intake passage 2. Operation of the fuel injection valve 6 is controlled by an electronic control unit (hereinafter referred to as "ECU") 5.

Figure 2:
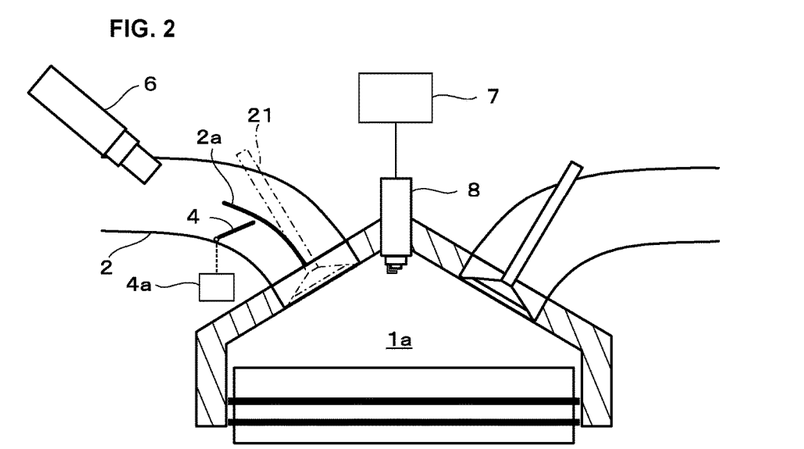
FIG. 2 illustrates an arrangement of a tumble flow control valve (4) provided in an intake passage.

As shown in FIG. 2, the intake passage 2 is provided with a partition wall 2a and a tumble flow control valve 4 which is disposed in one of the passages defined by the partition wall 2a. The tumble flow control valve 4 is configured so as to be opened and closed by an actuator 4a. The actuator 4a is connected to the ECU 5, and its operation is controlled by the ECU 5. A tumble flow of an air-fuel mixture is generated in a combustion chamber 1a by the tumble flow control valve 4.

Each cylinder of engine 1 is provided with a spark plug 8, and the spark plug 8 is connected to the ECU 5 via an ignition circuit unit 7. The ECU 5 controls a spark discharge start timing CAIG and a spark discharge continuation time period TSPK of the spark plug 8 as described below.

An intake air flow rate sensor 11 for detecting an intake air flow rate GAIR of the engine 1, an intake air temperature sensor 12 for detecting an intake air temperature TA, a throttle valve opening sensor 13 for detecting a throttle valve opening TH, an intake pressure sensor 14 for detecting an intake pressure PBA, a cooling water temperature sensor 15 for detecting an engine cooling water temperature TW, and other sensors not shown are connected to the ECU5, and detection signals of these sensors are supplied to the ECU 5.

The crank angle position sensor 16 for detecting a rotation angle of a crankshaft (not shown) of the engine 1 is connected to the ECU 5, and pulse signals depending on the rotation angle of the crankshaft is supplied to the ECU 5. The crank angle position sensor 16 outputs a plurality of pulse signals indicating the crank angle position. The pulse signals are used for controlling various timings, such as a fuel injection timing, an ignition timing (the spark discharge start timing of the spark plug 8), etc. and for detecting an engine rotational speed NE.

An exhaust passage 9 is provided with a three-way catalyst 10 for purifying exhaust gases. A catalyst temperature sensor 18 for detecting a temperature (hereinafter referred to as "catalyst temperature") TCAT of the three-way catalyst 10 is mounted on the three-way catalyst 10, and its detection signal is supplied to the ECU 5. A proportional-type air-fuel ratio sensor (hereinafter referred to as "LAF sensor") 17 is mounted on a portion of the exhaust passage 9 upstream of the three-way catalyst 10 and downstream of a joining portion of the exhaust manifold connected to each cylinder of the engine 1. The LAF sensor 17 outputs a detection signal substantially proportional to the oxygen concentration (air-fuel ratio AF) in exhaust gases and the detection signal is supplied to the ECU 5.

The ECU 5 includes an input circuit, a central processing unit (CPU), a memory circuit, and an output circuit. The input circuit has various functions including a function of shaping the waveforms of input signals from the various sensors, a function of correcting the voltage levels of the input signals to a predetermined level, and a function of converting analog signal values into digital signal values. The memory circuit stores various operational programs to be executed by the CPU, calculation results, and the like. The output circuit supplies drive signals to the fuel injection valves 6, the ignition circuit units 7, the actuator 4a, and the like.

The fuel injection amount of the fuel injection valve 6 is controlled by correcting a basic fuel amount with an air-fuel ratio correction coefficient KAF, wherein the basic fuel amount is calculated according to the intake air flow rate GAIR, and the air-fuel ratio correction coefficient KAF is calculated according to an air-fuel ratio AF detected by the LAF sensor 17 so that the detected air-fuel ratio AF coincides with a target air-fuel ratio AFCMD.

Figure 3:
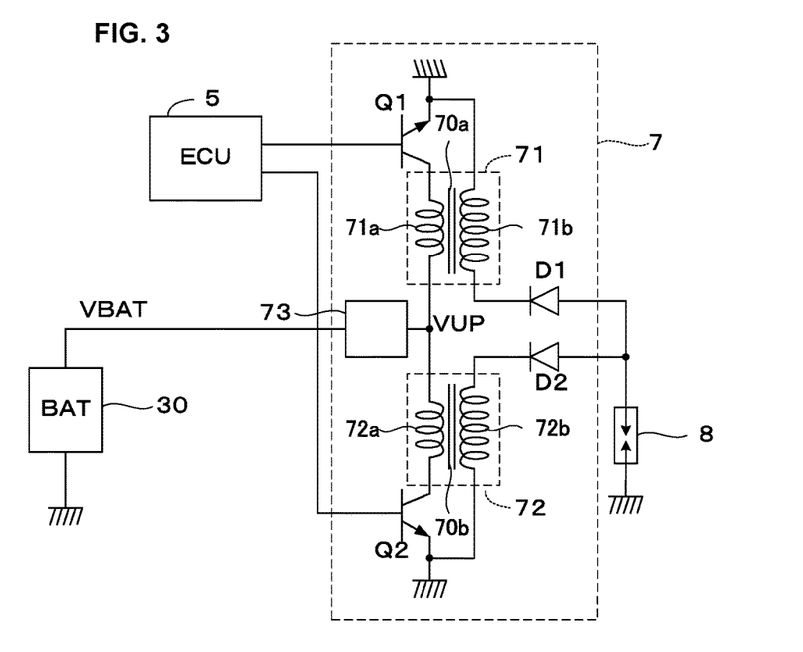
FIG. 3 shows a configuration of an ignition circuit unit (7) corresponding to one cylinder.

FIG. 3 shows a configuration of the ignition circuit unit 7 corresponding to one cylinder. The ignition circuit unit 7 includes a first coil pair 71, a second coil pair 72, a booster circuit 73, transistors Q1 and Q2, and diodes D1 and D2. The first coil pair 71 consists of a primary coil 71a and a secondary coil 71b, and the second coil pair 72 consists of a primary coil 72a and a secondary coil 72b. The booster circuit 73 boosts an output voltage VBAT of a battery 30 to output a boosted voltage VUP. The transistors Q1 and Q2 are provided for controlling current supply of the primary coils 71a and 72a. The diodes D1 and D2 are respectively connected between the spark plug 8 and the secondary coils 71b and 72b.

The bases of the transistors Q1 and Q2 are connected to the ECU 5, and an ON/OFF control of the two transistors (current supply control of the primary coils) is performed by the ECU 5. A continuation time period TSPK of spark discharge in the spark plug 8 (spark discharge continuation time period TSPK) can be changed according to an operating condition of the engine 1 by alternately supplying current to the two primary coils so that the current supply periods of the two primary coils partially overlap with each other. Further, the first termination timing of current supply to the primary coil corresponds to the spark discharge start timing CAIG, and the spark discharge start timing CAIG is also variable according to the operating condition of the engine 1.

Figure 4A:
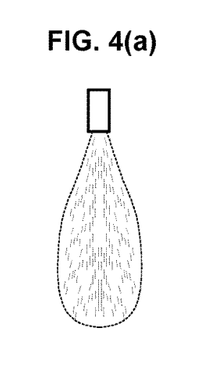
FIGS. 4(a) and 4(b) illustrate an injection state of fuel injected by a fuel injection valve (6).
Figure 4B:
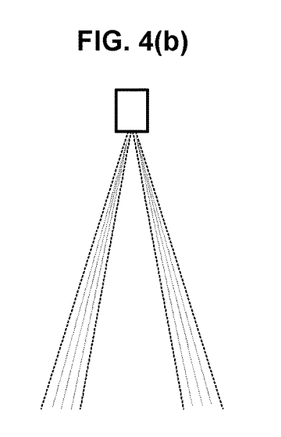

The fuel injection valve 6 is an injection valve which can inject atomized fuel. Specifically, an injection valve having a characteristic that the SMD (Sauter Mean Diameter) is about 35 µm (SMD at a point of 50 mm below the injection port when the fuel is injected under a fuel pressure of 350 kPa) is used. Further, an injection valve capable of changing an opening (lift amount) of the valve in at least two steps, is used as the fuel injection valve 6. FIG. 4(a) schematically illustrates an injection state of fuel injected by the fuel injection valve 6 (diffusion state of the injected fuel), and FIG. 4(b) illustrates an injection state of fuel injected by an ordinary fuel injection valve for comparison. According to the ordinary fuel injection valve, the injected fuel diffuses in conical shape and the fuel concentration in the peripheral region is relatively higher. According to the fuel injection valve 6, the reachable distance of the atomized fuel is shorter and homogeneity of the concentration distribution in the diffusion region is higher (concentration difference is less), compared with the ordinary fuel injection valve.

Figure 5:
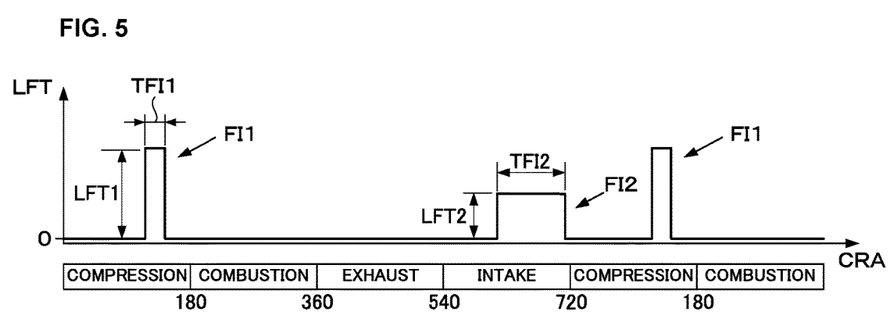
FIG. 5 shows an opening timing, an opening time period (TFI), and a lift amount upon opening of the fuel injection valve (6).

FIG. 5 shows an opening timing, an opening time period TFI, and a lift amount LFT upon opening of the fuel injection valve 6, and the horizontal axes indicates a crank angle CRA. In this embodiment, a first fuel injection FI1 is performed during the compression stroke in one combustion cycle, and a second fuel injection FI2 is performed during the intake stroke. Further, the lift amount LFT1 of the first fuel injection FI1 is comparatively large and the opening time period TFI1 is comparatively short, while the lift amount LFT2 of the second fuel injection FI2 is less than the lift amount LFT1, and the opening time period TFI2 is longer than the opening time period TFI1. The lift amounts LFT1 and LFT2 and the opening time periods (fuel injection time periods) TFI1 and TFI2 are set so that the sum of fuel injection amounts by the first and second fuel injections FI1 and FI2 coincides with a fuel injection amount corresponding to the target air-fuel ratio AFCMD.

A comparatively homogeneous air-fuel mixture is first formed in the intake passage 2 by the first fuel injection FI1 in which the fuel injection valve 6 capable of injecting atomized fuel is operated to open as shown in FIG. 5. Further by performing the second fuel injection FI2, it is possible to supply the required amount of fuel to the combustion chamber thereby making the detected air-fuel ratio AF coincide with the target air-fuel ratio AFCMD, as well as to form a homogeneous lean air-fuel mixture (a lean air-fuel mixture of high homogeneity) in which the air-fuel ratio distribution is substantially homogeneous.

Preferably, the first fuel injection FI1 is performed in the compression stroke of the object cylinder, and the termination timing of the second fuel injection FI2 is set to a timing immediately before the termination timing of the intake stroke.

In this embodiment, the target air-fuel ratio AFCMD after completion of warming up of the engine 1 is set within the range from "24" to "35", for example (hereinafter referred to as "very lean air-fuel ratio range"). The air-fuel ratio "24" (the predetermined air-fuel ratio AFL1) is set so that the NOx emission amount (NOx concentration in the exhaust gases) from the engine 1 is equal to or less than an allowable upper limit value CNOxHL (e.g., 120 ppm). The air-fuel ratio "35" is an air-fuel ratio set as a limit value for obtaining the required engine output.

Figure 6:
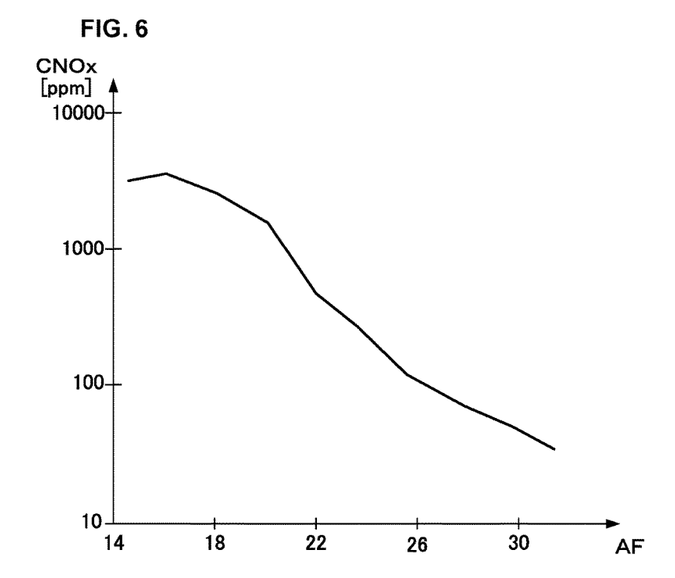
FIG. 6 shows a relationship between the air-fuel ratio (AF) and a NOx concentration (CNOx) in the exhaust gases.

FIG. 6 shows a relationship between the air-fuel ratio AF and a NOx concentration CNOx in the exhaust gases. In the range where the air-fuel ratio is equal to or greater than "16", the NOx concentration CNOx decreases as the air-fuel ratio increases (the air-fuel ratio becomes leaner). Accordingly, it is necessary to set the predetermined air-fuel ratio AFL1 so as to increase as the allowable upper limit value CNOxHL decreases.

The spark discharge start timing CAIG of the spark plug 8 is set to a range from 50 degrees to 15 degrees before the top dead center. The spark discharge continuation time period TSPK is set to a value from 1.8-3 msec for surely igniting the homogeneous lean air-fuel mixture. The boosted voltage VUP is set so that the spark discharge energy takes a value from 150-600 mJ when setting the spark discharge continuation time period TSPK as described above. Conventional lean air-fuel mixture combustion by the spark ignition is the stratified air-fuel mixture combustion which is realized by generating a flow of the mixture in the combustion chamber so that the air-fuel ratio in the vicinity of the spark plug becomes relatively small. In the homogeneous lean air-fuel mixture combustion of this embodiment, the spark discharge continuation time period TSPK is set to a comparatively long period, and the spark discharge start timing CAIG is set to a timing advanced from the ignition timing (e.g., 8 degrees) of the stratified air-fuel mixture combustion so as to ensure the spark discharge continuation time period TSPK set as described above.

Further, the geometric compression ratio (ratio of the combustion chamber capacity when the piston is located at the bottom dead center to the combustion chamber capacity when the piston is located at the top dead center) of the engine 1 is set to a value which is a little greater than the geometric compression ratio of the ordinary spark ignition engine so that the minimum effective compression ratio may take a value of about "9.0".

Further, a tumble flow generation control is performed to generate a tumble flow of a velocity of about 5-15 m/sec (when the engine rotational speed NE is equal to 1500 rpm) by changing the opening of the tumble flow control valve 4.

A strong flame kernel is formed by setting the spark discharge continuation time period TSPK to a comparatively long time period and generating the tumble flow in the combustion chamber, and the temperature of unburned air-fuel mixture at the compression dead center is raised to a temperature over 1000 degrees K by growing the formed flame kernel. This temperature rise makes it possible to change the elementary reaction dominating the laminar flow combustion speed to a reaction in which hydrogen peroxide disintegrates to generate OH radical, and to surely complete the combustion after the compression dead center.

Figure 7:
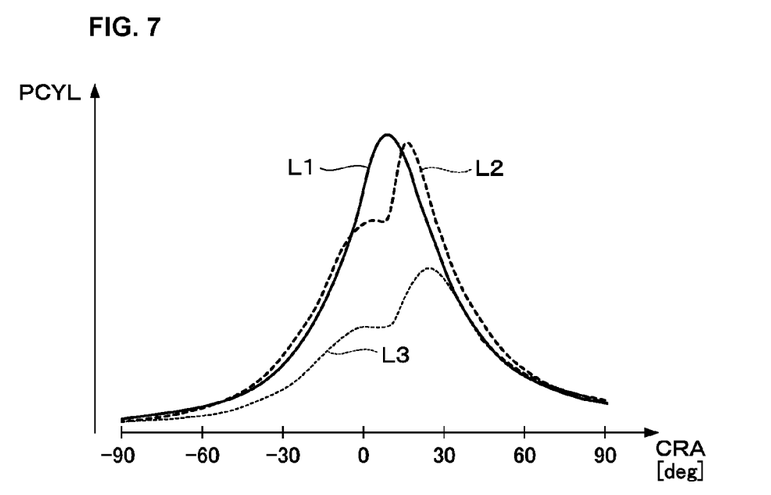
FIG. 7 shows changes in the in-cylinder pressure (PCYL) in the compression stroke and the combustion stroke.

FIG. 7 shows changes in the in-cylinder pressure PCYL during the compression stroke and the combustion stroke. The solid line L1 corresponds to this embodiment, and the thick broken line L2 corresponds to the HCCI (homogeneous charge compression ignition) combustion, and the thin broken line corresponds to the stoichiometric combustion (combustion when setting the air-fuel ratio to the stoichiometric air-fuel ratio). In FIG. 7, "0" degree of the crank angle CRA corresponds to the compression top dead center. It is to be noted that the ignition timing of the stoichiometric combustion is set to a timing advanced a little from the compression top dead center (for example, in the range within 10 degrees of the crank angle).

It is confirmed with FIG. 7 that stable combustion of high efficiency can be obtained by spark ignition combustion of the homogeneous lean air-fuel mixture in this embodiment.

Further, in this embodiment, the target air-fuel ratio AFCMD is set to a value within the range of the very lean air-fuel ratio according to the demand torque of the engine 1 after completion of warm-up of the engine 1, and the spark discharge start timing CAIG and the spark discharge continuation time period TSPK of the spark plug 8 are set according to the target air-fuel ratio AFCMD.

Figures 8A, 8B:
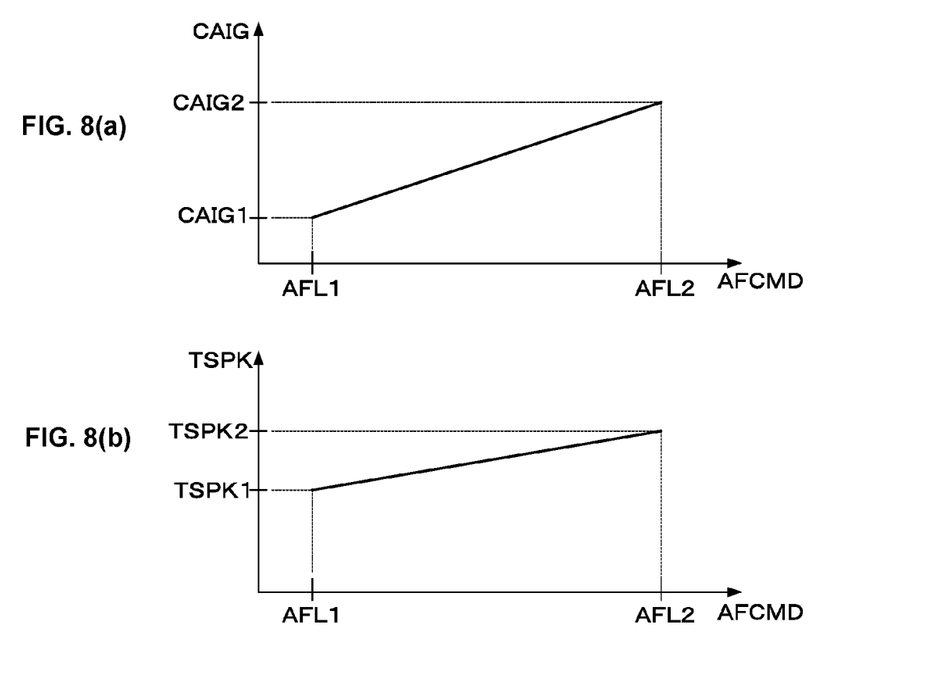
FIGS. 8(a) and 8(b) show tables for setting a spark discharge start timing (CAIG) and a spark discharge continuation time period (TSPK) of a spark plug according to a target air-fuel ratio (AFCMD) of a very lean air-fuel mixture.

Specifically, the spark discharge start timing CAIG (which is defined as an advance angular amount from the compression top dead center) is set so as to increase as the target air-fuel ratio AFCMD increases as shown in FIG. 8(a), and the spark discharge continuation time period TSPK is set so as to increase as the target air-fuel ratio AFCMD increases as shown in FIG. 8(b). AFL1 and AFL2 indicated in FIGS. 8(a) and 8(b) are predetermined air-fuel ratios respectively set, for example, to "24" and "35", CAIG1 and CAIG2 indicated in FIG. 8(a) are predetermined advance angular amounts respectively set, for example, to "15 degrees" and "50 degrees", and TSPK1 and TSPK2 indicated in FIG. 8(b) are predetermined spark discharge time periods respectively set, for example, to "1.8 msec" and "3 msec".

Preferably, the spark discharge start timing CAIG is set according to the target air-fuel ratio AFCMD as described above, and may be advanced more greatly as the engine rotational speed NE increases. Since the crank angle CRA corresponding to the spark discharge continuation time period TSPK increases as the engine rotational speed NE increases, advancing the spark discharge start timing CAIG makes it possible to ensure the spark discharge continuation time period TSPK required in a high rotational speed condition, thereby obtaining stable combustion.

As described above, according to this embodiment, the homogeneous air-fuel mixture of the very lean air-fuel ratio is formed in the combustion chamber, and the mixture can surely be ignited to complete the combustion. Accordingly, the homogeneous lean air-fuel mixture can be burned with the flame propagation combustion of good controllability, thereby realizing a combustion of high efficiency and less NOx emission.

Specifically, since the atomized fuel is injected into the intake passage by the fuel injection valve 6, a comparatively homogeneous lean air-fuel mixture is first formed in the intake passage, and the formed mixture is next sucked into the combustion chamber, thereby making it possible to form a lean air-fuel mixture of higher homogeneity. Further, since the spark discharge start timing CAIG and the spark discharge continuation time period TSPK of the spark plug are variable, by appropriately setting the spark discharge start timing CAIG and the spark discharge continuation time period TSPK, specifically, by setting the spark discharge start timing CAIG to a timing advanced from the spark discharge start timing for igniting the stratified lean mixture, the spark discharge continuation time period can be set to be longer, which enables surely igniting the homogeneous lean air-fuel mixture.

Further, the spark discharge start timing CAIG is advanced more greatly and the spark discharge continuation time period TSPK is made to be longer, as the target air-fuel ratio AFCMD increases in the very lean air-fuel ratio range shown in FIGS. 8(a) and 8(b) from the predetermined lean air-fuel ratio AFL1 to the predetermined lean air-fuel ratio AFL2. Accordingly, stable combustion can be realized corresponding to changes in the target air-fuel ratio AFCMD.

Further, since the flow of the air-fuel mixture is generated in the combustion chamber using the tumble flow control valve 4, a strong initial flame kernel, i.e., an initial flame kernel capable of raising the temperature of the combustion air-fuel mixture at the compression dead center to a value equal to or higher than 1000 degrees K, is formed by the flow of the air-fuel mixture and an appropriate setting of the spark discharge continuation time period TSPK of the spark plug 8, thereby realizing combustion of high efficiency. In other words, according to this embodiment, the air-fuel mixture flow in the combustion is generated not for relatively reducing the air-fuel ratio in the vicinity of the spark plug, but for forming the strong initial flame kernel capable of completing the combustion.

Further, a lean air-fuel mixture of high homogeneity is formed in the intake passage by the first fuel injection FI1 during the closing time period of the intake valve 21, and by thereafter performing the second fuel injection FI2 during the opening time period of the intake valve, it is possible to form a lean air-fuel mixture of higher homogeneity in the combustion chamber 1a.

Further, the predetermined lean air-fuel ratio AFL1 which is a lower limit value of the very lean air-fuel ratio range, is set so that an amount of NOx discharged from the combustion chamber is equal to or less than the allowable upper limit value. Accordingly, the NOx emission amount can surely be reduced to a value equal to or less than the allowable upper limit value by controlling the air-fuel ratio within the very lean air-fuel ratio range which is learner than the predetermined lean air-fuel ratio AFL1.

In this embodiment, a temperature rise acceleration control of the three-way catalyst 10 is performed immediately after the cold start of the engine 1. The temperature rise acceleration control is specifically described below.

Figure 9:
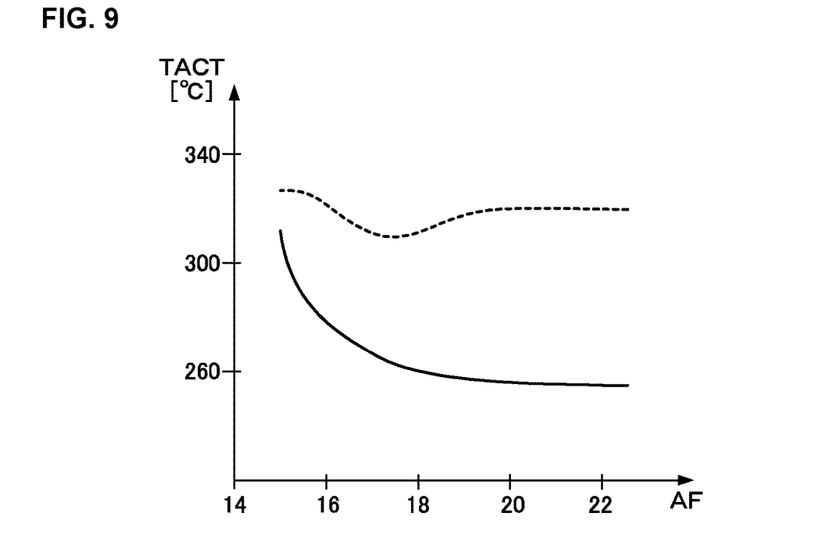
FIG. 9 shows relationships between the air-fuel ratio (AF) and the activation temperature (TACT) of a three-way catalyst.

FIG. 9 shows relationships between the air-fuel ratio AF and the activation temperature TACT of the three-way catalyst 10. In FIG. 9, the solid line corresponds to the three-way catalyst 10 containing platinum, and the broken line indicates, for comparison, a relationship between the air-fuel ratio AF and the activation temperature TACT of a three-way catalyst containing palladium. The activation temperature TACT is defined as a temperature at which a removing efficiency (HC removing efficiency) of hydrocarbon components in the exhaust gases is equal to 10%.

With reference to FIG. 9, it is confirmed that the activation temperature TACT of the three-way catalyst 10 containing platinum falls as the air-fuel ratio AF increases, while the activation temperature TACT of the three-way catalyst containing palladium takes a minimum value (the activation becomes earliest) in the range of the air-fuel ratio AF approximately from "17" to "18". Accordingly, it is effective for early activation of the three-way catalyst 10 to perform the temperature rise acceleration control with the lean air-fuel ratio combustion of the mixture having an air-fuel ratio approximately from "20" to "22".

Figure 10:
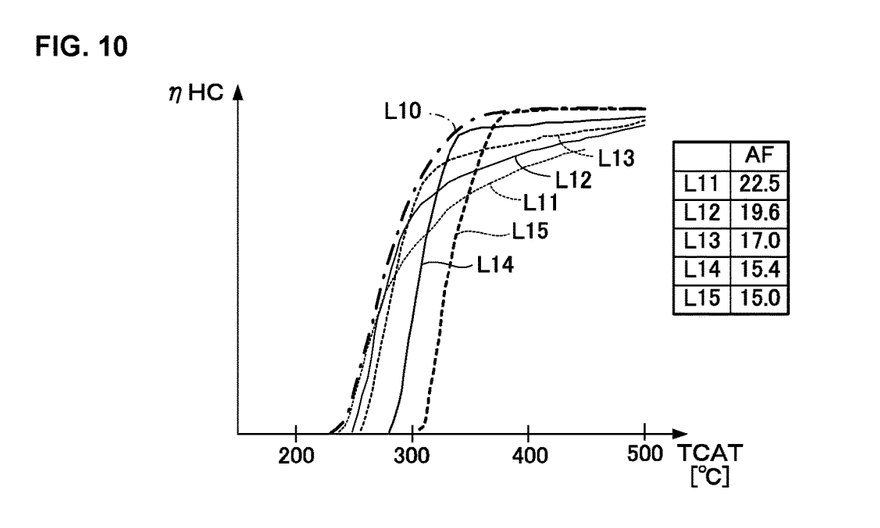
FIG. 10 shows relationships between a temperature (TCAT) of the three-way catalyst and an HC removing efficiency ($\eta$HC).

FIG. 10 shows relationships between a temperature of the three-way catalyst 10, i.e., the catalyst temperature TCAT and the HC removing efficiency ηHC. The curves L11-L15 correspond respectively to the air-fuel ratios AF shown in FIG. 10. It is confirmed from FIG. 10 that a high removing efficiency can be obtained at the air-fuel ratio AF of "22.5" when the catalyst temperature TACT is about 250 degrees C., and the high removing efficiency can always be obtained by reducing the air-fuel ratio AF as the catalyst temperature TCAT rises.

Consequently, in the temperature rise acceleration control of this embodiment, the relationship between the catalyst temperature TCAT and the HC removing efficiency ηHC indicated by the dot-and-dash line L10 in FIG. 10 is realized by controlling the air-fuel ratio AF according to the catalyst temperature TCAT.

Figure 11:
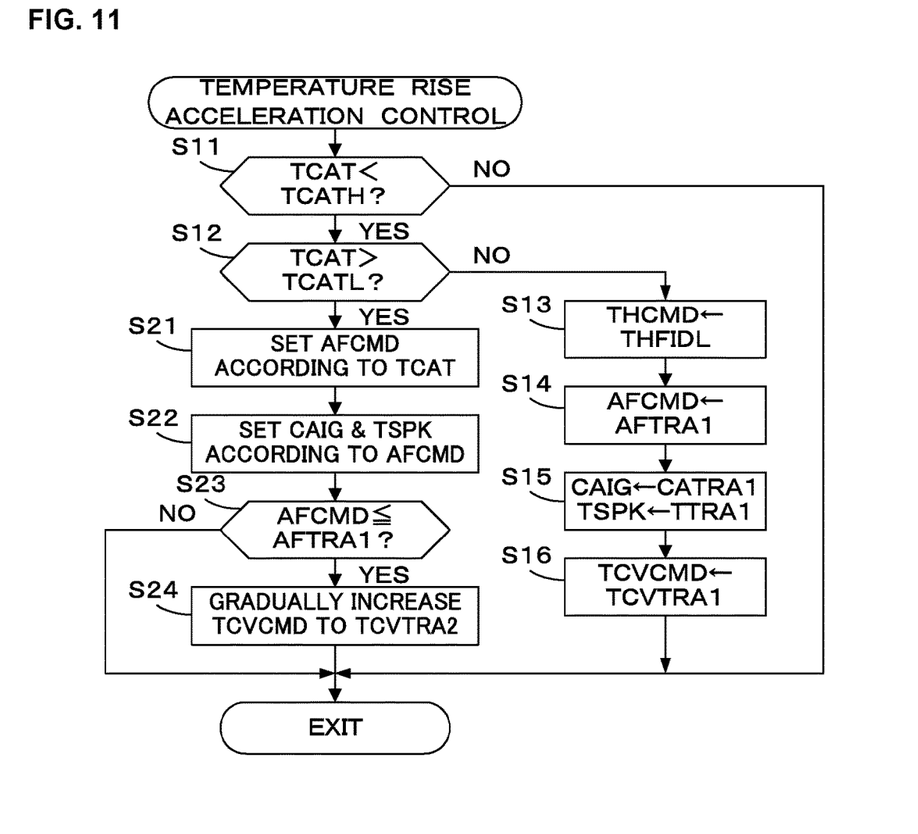
FIG. 11 is a flowchart of a temperature rise acceleration control process of the three-way catalyst.

FIG. 11 is a flowchart of the above-described temperature rise acceleration control process. This process is executed at intervals of a predetermined time period (for example, 10 msec) in the ECU 5.

In step S11, it is determined whether or not the catalyst temperature TCAT is lower than a predetermined upper temperature TCATH (for example, 350 degrees C.), and if the answer to step S11 is negative (NO), i.e., the catalyst temperature TCAT is sufficiently high, the process immediately ends. If the answer to step S11 is affirmative (YES), it is determined whether or not the catalyst temperature TCAT is higher than a predetermined lower temperature TCATL (for example, 220 degrees C.), (step S12). Immediately after the cold start of the engine 1, the answer to step S12 is at first negative, and the first temperature rise acceleration control is performed in steps S13-S16. The predetermined lower temperature TCATL corresponds to a minimum temperature of the temperature range in which the temperature rise acceleration control by the above-described lean air-fuel ratio combustion (the second temperature rise acceleration control) is effective.

In step S13, the target opening THCMD of the throttle valve 3 is set to a temperature rise acceleration idle opening THFIDL, to increase the intake air amount of the engine 1. In step S14, the target air-fuel ratio AFCMD is set to the first predetermined air-fuel ratio AFTRA1 (for example, "16"). In step S15, the spark discharge start timing CAIG of the spark plug 8 is set to a first predetermined timing CATRA1 (for example, 3 degrees) on the retard side with respect to the optimum ignition timing, and the spark discharge continuation time period TSPK is set to a first predetermined time period TTRA1 (for example, 2.0 msec (a value corresponding to a spark discharge energy of 180 mJ)). In step S16, an opening command value TCVCMD of the tumble flow control valve 4 is set to a first predetermined opening TCVTRA1 which is comparatively small. This setting corresponds to an opening at which the flow strength becomes comparatively high. In this embodiment, the spark discharge start timing CAIG is defined as advance angular amount from the compression top dead center. Further, increase in the opening command value TCVCMD corresponds to reduction in the tumble flow strength.

It is to be noted that each of the target opening THCMD, the target air-fuel ratio AFCMD, the spark discharge continuation time period TSPK, and the opening command value TCVCMD is gradually changed from its initial value at the start of cranking of the engine 1 to the above-described set value.

If the catalyst temperature TCAT exceeds the predetermined lower temperature TCATL by the first temperature rise acceleration control, the answer to step S12 becomes affirmative (YES), and the second temperature rise acceleration control is performed in steps S21-S24.

Figure 12A:
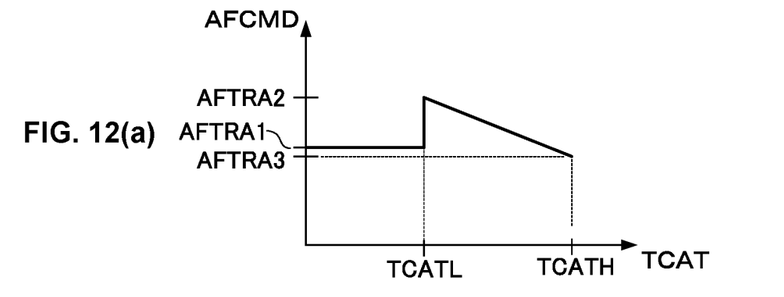
FIGS. 12(a), 12(b) and 12(c) show tables referred to in the process of FIG. 11.

In step S21, an AFCMD table shown in FIG. 12(a) is retrieved according to the catalyst temperature TCAT, to set the target air-fuel ratio AFCMD. The AFCMD table is set so that the target air-fuel ratio AFCMD is set to the first predetermined air-fuel ratio AFTRA1 in the range where the catalyst temperature TCAT is lower than the predetermined lower temperature TCATL, and in the range where the catalyst temperature TCAT is equal to or higher than the predetermined lower temperature TCATL, the target air-fuel ratio AFCMD decreases as the catalyst temperature TCAT rises. The second predetermined air-fuel ratio AFTRA2 and the third predetermined air-fuel ratio AFTRA3 shown in FIG. 12(a) are respectively set to "22.5" and "14.7", for example.

Figure 12B:
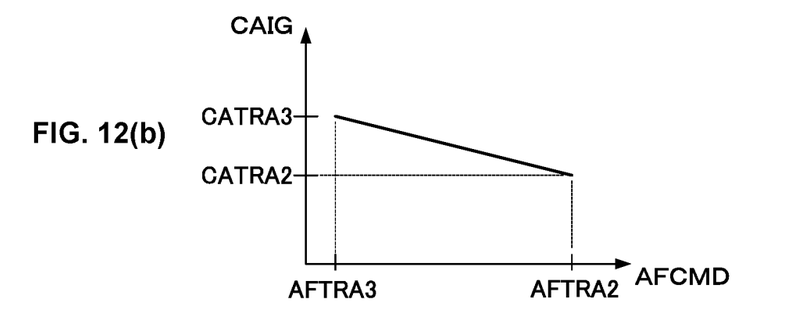
Figure 12C:
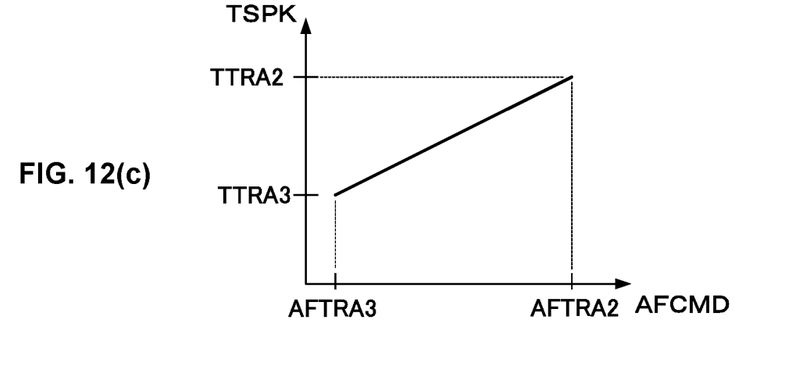

In step S22, the spark discharge start timing CAIG and the spark discharge continuation time period TSPK are set according to the target air-fuel ratio AFCMD. Specifically, a CAIG table shown in FIG. 12(b) is retrieved according to the target air-fuel ratio AFCMD, to calculate the spark discharge start timing CAIG, and a TSPK table shown in FIG. 12(c) is retrieved according to the target air-fuel ratio AFCMD, to calculate the spark discharge continuation time period TSPK.

The CAIG table is set so that the spark discharge start timing CAIG decreases as the target air-fuel ratio AFCMD increases. The second predetermined timing CATRA2 and the third predetermined timing CATRA3 shown in FIG. 12(b) are respectively set to "0 degree" and "10 degrees" for example. The second predetermined timing CATRA2 is set to a timing which is on the retard side with respect to the optimum ignition timing, and is further retarded from the first predetermined timing CATRA1.

The TSPK table is set so that the spark discharge continuation time period TSPK increases as the target air-fuel ratio AFCMD increases. The second predetermined time period TTRA2 and the third predetermined time period TTRA3 shown in FIG. 12(c) are respectively set to "5.0 msec" and "1.5 msec" for example.

In step S23, it is determined whether or not the target air-fuel ratio AFCMD is equal to or less than the first predetermined air-fuel ratio AFTRA1. If the answer to step S23 is negative (NO), the process immediately ends. If the answer to step S23 is affirmative (YES), a process for gradually increasing the opening command value TCVCMD of the tumble flow control valve 4 from a first predetermined opening TCVTRA1 to a second predetermined opening TCVTRA2 (>TCVTRA1) is performed (step S24).

It is to be noted that at the beginning of the second temperature rise acceleration control, a transition control is performed wherein the target air-fuel ratio AFCMD, the spark discharge start timing CAIG, and the spark discharge continuation time period TSPK are gradually changed from the set values in the first temperature rise acceleration control to the first set values calculated in steps S21 and S22.

Figure 13A:
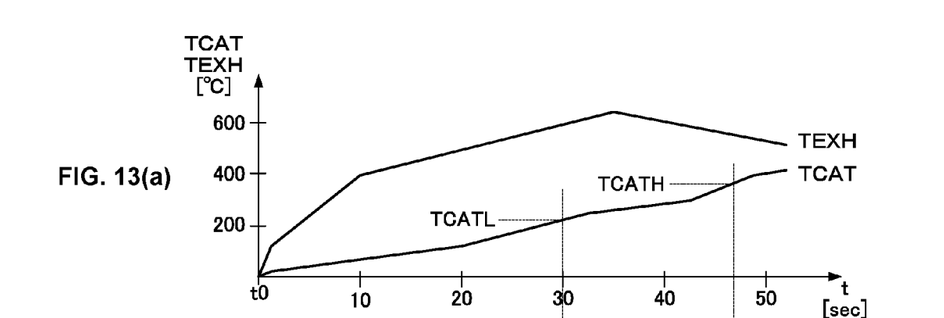
FIGS. 13(a)-13(e) show time charts for illustrating an operation example of the temperature rise acceleration control of FIG. 11.
Figure 13B:
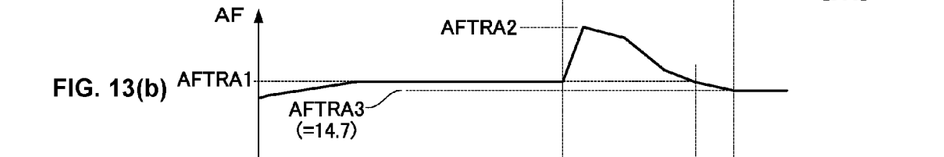
Figure 13C:
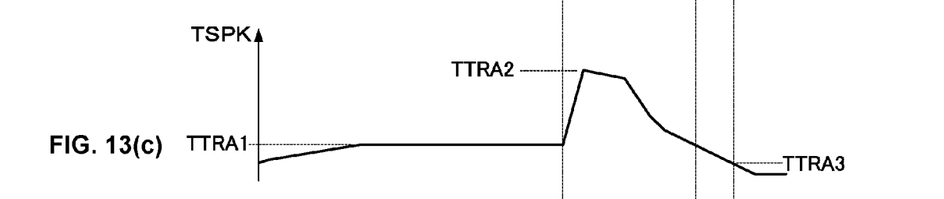
Figure 13D:
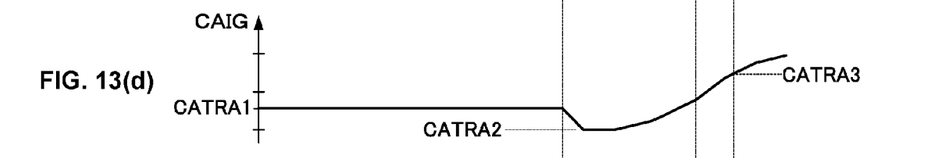
Figure 13E:
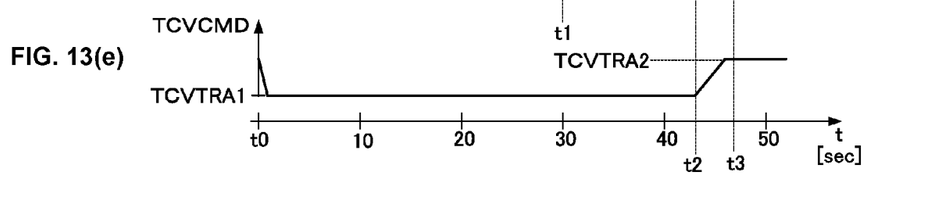

FIGS. 13(a)-13(e) show time charts for illustrating an operation example of the temperature rise acceleration control of FIG. 11. FIG. 13(a) shows changes in the catalyst temperature TCAT and the exhaust gas temperature TEXH from the time (time t0) of starting the engine 1, and FIG. 13(b)-FIG. 13(e) respectively show changes in the air-fuel ratio AF, the spark discharge continuation time period TSPK, the spark discharge start timing CAIG, and the opening command value TCVCMD of the tumble flow control valve 4 from time t0.

The first temperature rise acceleration control is performed from the time immediately after start of the engine 1, and the air-fuel ratio AF, the spark discharge continuation time period TSPK, the spark discharge start timing CAIG, and the opening command value TCVCMD are respectively set to the first predetermined air-fuel ratio AFTRA1, the first predetermined time period TTRA1, the first predetermined timing CATRA1, and the first predetermined opening TCVTRA1.

When the catalyst temperature TCAT reaches the predetermined lower temperature TCATL at time t1, the first temperature rise acceleration control shifts to the second temperature rise acceleration control. At the beginning of the second temperature rise acceleration control, the transient control for gradually changing the parameters to their first set values is performed. That is, the air-fuel ratio AF, the spark discharge continuation time period TSPK, and the spark discharge start timing CAIG are respectively changed to the second predetermined air-fuel ratio AFTRA2, the second predetermined time period TTRA2, and the second predetermined timing CATRA2. It is to be noted that the opening command value TCVCMD is maintained at the first predetermined opening TCVTRA1 until time t2. Time t2 is a time at which the target air-fuel ratio AFCMD decreases to reach the first predetermined air-fuel ratio AFTRA1 (refer to FIG. 11, step S23).

At time t3, the catalyst temperature TCAT reaches the predetermined upper temperature TCATH, and the second catalyst temperature rise acceleration control ends. After termination of the second temperature rise acceleration control, the ordinary control is performed wherein the target air-fuel ratio AFCMD is set according to the engine operating condition.

As described above, in this embodiment, the first temperature rise acceleration control is performed immediately after start of the engine 1 for accelerating temperature rise in the three-way catalyst 10 until time t1 at which the catalyst temperature TCAT reaches the predetermined lower temperature TCATL, and the second temperature rise acceleration control is performed after time t1. In the first temperature rise acceleration control, the intake air amount of the engine 1 is increased by increasing the opening of the throttle valve 3, the air-fuel ratio AF is controlled to the first lean air-fuel ratio AFTRA1 which is leaner than the stoichiometric ratio, and the spark discharge start timing CAIG of the spark plug 8 is set to the first predetermined timing CATRA1 which is on the retard side with respect to the optimum ignition timing. In the second temperature rise acceleration control, the air-fuel ratio AF is controlled to the second predetermined air-fuel ratio AFTRA2 which is leaner than the first predetermined air-fuel ratio AFTRA1, the spark discharge start timing CAIG is set to the timing which is further retarded from the first predetermined timing CATRA1, and the spark discharge continuation time period TSPK of the spark plug 8 is increased.

The three-way catalyst 10 containing platinum can be activated at a lower temperature by setting the air-fuel ratio AF to a leaner air-fuel ratio (e.g., about "22") which is leaner than the set air-fuel ratio (e.g., "16") of the conventional catalyst temperature rise acceleration control. Accordingly, by performing the second temperature rise acceleration control after time t1 at which the catalyst temperature TCAT reaches the predetermined lower temperature TCATL, it is possible to hasten the activation of the three-way catalyst 10. Consequently, fuel efficiency can be improved by making the air-fuel ratio AF further leaner and shortening the execution time period of the catalyst acceleration control.

Further, since the second temperature rise acceleration control becomes effective after the timing at which the catalyst temperature TCAT reaches the predetermined lower temperature TCATL, remarkable temperature rise acceleration effect can be obtained by performing the second temperature rise acceleration control from the time the catalyst temperature TCAT exceeds the predetermined lower temperature TCATL.

Further, in the second temperature rise acceleration control, the air-fuel ratio AF is reduced, the spark discharge start timing CAIG is advanced, and the spark discharge continuation time period TSPK is reduced, as the catalyst temperature TCAT increases. The three-way catalyst 10 containing platinum has a characteristic that the purifying performance becomes higher as the air-fuel ratio AF approaches the stoichiometric air-fuel ratio when the catalyst temperature TCAT is high. Accordingly, by reducing the air-fuel ratio AF as the catalyst temperature TCAT rises, it is possible to obtain high purifying performance. Further, stable combustion is obtained by reducing the air-fuel ratio AF if the spark discharge start timing CAIG is advanced and the spark discharge continuation time period TSPK is reduced. Consequently, by advancing the spark discharge start timing CAIG and reducing the spark discharge continuation time period TSPK as much as possible, the engine output can be increased and the energy efficiency can be raised.

Further, at the beginning of the second temperature rise acceleration control, the opening of the tumble flow control valve 4 is set to the first predetermined opening TCVTRA1 to control the strength of the flow to a comparatively high degree, and the strength of the flow is gradually reduced from the time the air-fuel ratio AF is reduced to a value in the vicinity of the first predetermined air-fuel ratio AFTRA1. Reduction in the air-fuel ratio AF prevents the combustion from becoming unstable when the strength of the flow is reduced. Accordingly, reduction in the strength of the flow makes it possible to reduce heat loss of the combustion, thereby improving thermal efficiency.

In this embodiment, the ignition circuit unit 7 and the spark plug 8 correspond to the spark ignition means, and the partition wall 2a and the tumble flow control valve 4 correspond to the flow generating means. The ECU 5 constitutes the ignition control means, the air-fuel ratio control means, the first temperature rise acceleration control means, and the second temperature rise acceleration control means. The fuel injection valve 6 and the ECU 5 constitutes the homogeneous lean air-fuel mixture forming means, and the catalyst temperature sensor 18 constitutes the temperature parameter obtaining means.

The present invention is not limited to the embodiment described above, and various modifications may be made. For example, in the above-described embodiment, the detected catalyst temperature TCAT is used as the catalyst temperature parameter. Alternatively, the catalyst temperature TCAT may be replaced with the following parameter. That is, an exhaust gas temperature sensor may be disposed upstream of the three-way catalyst 10, and an exhaust gas temperature TEXH detected by the exhaust gas temperature sensor may be used as the catalyst temperature parameter. In such modification, the exhaust gas temperature sensor constitutes the temperature parameter obtaining means. Further, an estimated catalyst temperature TCATE may be calculated according to the operating condition of the engine 1 using the catalyst temperature estimation method shown, for example, in Japanese patent laid-open publication No. 2012-77740, and the estimated catalyst temperature TCATE may be used as the catalyst temperature parameter.

Further, in the above-described embodiment, the control switch timing (time t1) from the first temperature rise acceleration control to the second temperature rise acceleration control is set to a timing at which the catalyst temperature TCAT reaches the predetermined lower temperature TCATL. Alternatively, the control switch timing may be set to a timing at which an elapsed time period from the start timing of the cold start of the engine 1 reaches a time period during which the catalyst temperature TCAT is estimated to reach the predetermined lower temperature TCATL. Further alternatively, the control switch timing may be set to a timing at which an accumulated fuel injection amount from the start timing of the cold start of the engine 1 reaches a value at which the catalyst temperature TCAT is estimated to reach the predetermined lower temperature TCATL. In other words, the control switch timing may be set to a timing at which the catalyst temperature TCAT is estimated to reach the temperature at which the second temperature rise acceleration control becomes effective.

Further, in the above-described embodiment, a mechanism for generating the tumble flow is used as the flow generating means. Alternatively, a mechanism for generating the swirl flow may be used as the flow generating means. The combustion chamber 1a and the top of the piston may be configured so that the squish flow is generated. Further, in the ignition circuit 7, two coil pairs are provided corresponding to one spark plug. Alternatively, three or more coil pairs may be provided corresponding to one spark plug.

Further, an example of the four-cylinder engine is shown in the above-described embodiment, but the present invention is applicable regardless of the number of cylinders. Further, the present invention is applicable to a combustion control apparatus for a watercraft propulsion engine such as an outboard engine having a vertically extending crankshaft.

DESCRIPTION OF REFERENCE NUMERALS

1 Internal combustion engine
2 Intake passage
2a Partition wall (flow generating means)
4 Tumble flow control valve (flow generating means)
5 Electronic control unit (ignition control means, air-fuel ratio control means, homogeneous lean air-fuel mixture forming means, first and second temperature rise acceleration control means)
6 Fuel injection valve (homogeneous lean air-fuel mixture forming means)
7 Ignition circuit unit (spark ignition means)
8 Spark plug (spark ignition means)
10 Three-way catalyst
18 Catalyst temperature sensor (temperature parameter obtaining means)
19 Actuator
AFCMD Target air-fuel ratio
CAIG Spark discharge start timing
TSPK Spark discharge continuation time period
AFCMD Target air-fuel ratio

The invention claimed is:

1. A combustion control apparatus for an internal combustion engine, comprising spark ignition means for performing spark ignition of an air-fuel mixture in a combustion chamber of said engine, ignition control means for controlling said spark ignition means, and air-fuel ratio control means for controlling an air-fuel ratio of the air-fuel mixture in said combustion chamber, the combustion control apparatus further comprising homogeneous lean mixture forming means for forming a homogeneous lean air-fuel mixture in said combustion chamber, wherein said spark ignition means includes a spark plug, and a plurality of ignition coil pairs for generating spark discharge in said spark plug, a start timing and a continuation time period of the spark discharge in said ignition plug being variable, wherein said homogeneous lean mixture forming means injects fuel into an intake passage of said engine using a fuel injection valve capable of injecting atomized fuel, wherein said air-fuel ratio control means controls the air-fuel ratio to an air-fuel ratio which is leaner than a predetermined lean air-fuel ratio, the predetermined lean air-fuel ratio being leaner than the stoichiometric air-fuel ratio, wherein said ignition control means controls the spark discharge start timing and the spark discharge continuation time period of said spark plug, wherein an exhaust passage of said engine is provided with a three-way catalyst containing platinum, the combustion control apparatus further comprising first temperature rise acceleration control means for performing a first temperature rise acceleration control for accelerating temperature rise in said three-way catalyst until a control switch timing immediately after start of said engine; and second temperature rise acceleration control means for performing a second temperature rise acceleration control for accelerating temperature rise in said three-way catalyst after the control switch timing, wherein said first temperature rise acceleration control means performs the first temperature rise acceleration control by increasing an intake air amount of said engine, controlling the air-fuel ratio of the air-fuel mixture to a first lean air-fuel ratio which is leaner than the stoichiometric ratio, and setting the spark discharge start timing of said spark plug to a predetermined retard ignition timing which is on the retard side with respect to the optimum ignition timing, wherein said second temperature rise acceleration control means controls the air-fuel ratio to a second lean air-fuel ratio which is leaner than the first lean air-fuel ratio, sets the spark discharge start timing to a timing which is further retarded from the predetermined retard ignition timing, and increases the spark discharge continuation time period.

2. The combustion control apparatus according to claim 1, wherein said ignition control means advances the spark discharge start timing and makes the spark discharge continuation time period longer, as the air-fuel ratio increases in a leaner air-fuel ratio range with respect to the predetermined lean air-fuel ratio.

3. The combustion control apparatus according to claim 1, further comprising flow generating means for generating a flow of the air-fuel mixture sucked into said combustion chamber.

4. The combustion control apparatus according to claim 1, wherein said homogeneous lean mixture forming means performs a first fuel injection by said fuel injection valve during a closing time period of an intake valve of said engine, and performs a second fuel injection by said fuel injection valve during an opening time period of said intake valve.

5. The combustion control apparatus according to claim 1, wherein the predetermined lean air-fuel ratio is set so that an amount of NOx discharged from said combustion chamber is equal to or less than an allowable upper limit value.

6. The combustion control apparatus according to claim 1, further comprising temperature parameter obtaining means for obtaining a catalyst temperature parameter which has correlation with a temperature of said three-way catalyst,
wherein the control switch timing is a timing at which the catalyst temperature parameter reaches a predetermined temperature.

7. The combustion control apparatus according to claim 1, wherein said second temperature rise acceleration control means reduces the air-fuel ratio, advances the spark discharge start timing, and reduces the spark discharge continuation time period, as the catalyst temperature parameter increases.

8. The combustion control apparatus according to claim 1, further comprising flow generating means for generating a flow of the air-fuel mixture sucked into said combustion chamber,
wherein said second temperature rise acceleration control means controls strength of the flow to a comparatively high degree at the beginning of the second temperature rise acceleration control, and gradually reduces the strength of the flow from the time the air-fuel ratio is reduced to a value in the vicinity of the first lean air-fuel ratio.

9. The combustion control apparatus according to claim 2, further comprising flow generating means for generating a flow of the air-fuel mixture sucked into said combustion chamber.

10. The combustion control apparatus according to claim 2, wherein said homogeneous lean mixture forming means performs a first fuel injection by said fuel injection valve during a closing time period of an intake valve of said engine, and performs a second fuel injection by said fuel injection valve during an opening time period of said intake valve.

11. The combustion control apparatus according to claim 3, wherein said homogeneous lean mixture forming means performs a first fuel injection by said fuel injection valve during a closing time period of an intake valve of said engine, and performs a second fuel injection by said fuel injection valve during an opening time period of said intake valve.

12. The combustion control apparatus according to claim 2, wherein the predetermined lean air-fuel ratio is set so that an amount of NOx discharged from said combustion chamber is equal to or less than an allowable upper limit value.

13. The combustion control apparatus according to claim 3, wherein the predetermined lean air-fuel ratio is set so that an amount of NOx discharged from said combustion chamber is equal to or less than an allowable upper limit value.

14. The combustion control apparatus according to claim 4, wherein the predetermined lean air-fuel ratio is set so that an amount of NOx discharged from said combustion chamber is equal to or less than an allowable upper limit value.

15. The combustion control apparatus according to claim 6, wherein said second temperature rise acceleration control means reduces the air-fuel ratio, advances the spark discharge start timing, and reduces the spark discharge continuation time period, as the catalyst temperature parameter increases.

16. The combustion control apparatus according to claim 6, further comprising flow generating means for generating a flow of the air-fuel mixture sucked into said combustion chamber,
wherein said second temperature rise acceleration control means controls strength of the flow to a comparatively high degree at the beginning of the second temperature rise acceleration control, and gradually reduces the strength of the flow from the time the air-fuel ratio is reduced to a value in the vicinity of the first lean air-fuel ratio.

17. The combustion control apparatus according to claim 7, further comprising flow generating means for generating a flow of the air-fuel mixture sucked into said combustion chamber,
wherein said second temperature rise acceleration control means controls strength of the flow to a comparatively high degree at the beginning of the second temperature rise acceleration control, and gradually reduces the strength of the flow from the time the air-fuel ratio is reduced to a value in the vicinity of the first lean air-fuel ratio.

18. A combustion control apparatus for an internal combustion engine having a three-way catalyst containing platinum provided in an exhaust passage of said engine, the combustion control apparatus comprising:
spark ignition means for performing spark ignition of an air-fuel mixture in a combustion chamber of said engine;
homogeneous lean mixture forming means for forming a homogeneous lean air-fuel mixture in said combustion chamber;
first temperature rise acceleration control means for performing a first temperature rise acceleration control for accelerating temperature rise in said three-way catalyst until a control switch timing immediately after start of said engine; and
second temperature rise acceleration control means for performing a second temperature rise acceleration control for accelerating temperature rise in said three-way catalyst after the control switch timing,
wherein said spark ignition means includes a spark plug, and a plurality of ignition coil pairs for generating spark discharge in said spark plug, a start timing and a continuation time period of the spark discharge in said ignition plug being variable,
wherein said first temperature rise acceleration control means performs the first temperature rise acceleration control by increasing an intake air amount of said engine, controlling the air-fuel ratio of the air-fuel mixture to a first lean air-fuel ratio which is leaner than the stoichiometric ratio, and setting the spark discharge start timing of said spark plug to a predetermined retard ignition timing which is on the retard side with respect to the optimum ignition timing, wherein said second temperature rise acceleration control means controls the air-fuel ratio to a second lean air-fuel ratio which is leaner than the first lean air-fuel ratio, sets the spark discharge start timing to a timing which is further retarded from the predetermined retard ignition timing, and increases the spark discharge continuation time period.

\* \* \* \* \*